US008146051B2

(12) United States Patent
Hartman et al.

(10) Patent No.: US 8,146,051 B2
(45) Date of Patent: Mar. 27, 2012

(54) METHOD AND COMPUTER PROGRAM PRODUCT FOR PROVIDING A REPRESENTATION OF SOFTWARE MODELED BY A MODEL

(75) Inventors: Alan Hartman, Haifa (IL); Shiri Kremer, Yavniel (IL); Yael Shaham-Gafni, Haifa (IL); Netta Shani, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1577 days.

(21) Appl. No.: 11/537,677

(22) Filed: Oct. 2, 2006

(65) Prior Publication Data

US 2008/0082958 A1    Apr. 3, 2008

(51) Int. Cl.
    *G06F 9/45*    (2006.01)
(52) U.S. Cl. ........................................ 717/104; 717/126
(58) Field of Classification Search .................. 717/104, 717/126
    See application file for complete search history.

(56) References Cited

U.S. PATENT DOCUMENTS

| 6,467,086 | B1 | 10/2002 | Kiczales et al. | |
|---|---|---|---|---|
| 6,539,390 | B1 | 3/2003 | Kiczales et al. | |
| 6,618,733 | B1 | 9/2003 | White et al. | |
| 6,832,365 | B1 | 12/2004 | Chiles et al. | |
| 7,013,264 | B2 | 3/2006 | Dolan et al. | |
| 7,047,518 | B2 * | 5/2006 | Little et al. | 717/108 |
| 2003/0167455 | A1 * | 9/2003 | Iborra et al. | 717/105 |
| 2006/0074732 | A1 * | 4/2006 | Shukla et al. | 705/8 |
| 2006/0242624 | A1 * | 10/2006 | Mueller-Klingspor | 717/114 |

OTHER PUBLICATIONS

D. Coppit, B.Cox, "Software Plans for Separation of Concerns", ACP4IS Workshop, 2004.
W.Harrison, H. Ossher, S. Sutton Jr., P.Tarr, "Concern Modeling in Concern Manipulation Environment", IBM Research Report, 2005.
J. Suzuki , Y. Yamamoto, "Extending UML with Aspects: Aspect Support in the Design Phase", Proceedings of the Workshop on Object-Oriented Technology, 1999.
D.Stein, S.Hanenberg, R.Unland, "An UML-based Aspect Oriented Design Notation for Aspect J", Proceedings of 1st international conference on Aspect-oriented software development, 2002.
Park et al., "An abstraction method for state minimization based on syntactic and semantic patterns in the execution space of real-time systems", Journal of KISS: Software and Applications, v 30, n 1-2, Feb. 2003, p. 103-16 Language: Chinese (Abstract only).

* cited by examiner

*Primary Examiner* — John Chavis

(57) ABSTRACT

A computer program product and a method for providing a graphical representation of a software, the method includes: receiving semantic concern defining information; populating at least one semantic concern, in response to the received semantic concern defining information; and associating between multiple elements in response to semantic relation information, if semantic concern relation information was previously received.

17 Claims, 9 Drawing Sheets

METHOD AND COMPUTER PROGRAM PRODUCT FOR PROVIDING A REPRESENTATION OF SOFTWARE MODELED BY A MODEL

FIELD OF THE INVENTION

The present invention relates to methods and computer program products for providing a representation of software modeled by a model.

BACKGROUND OF THE INVENTION

The size and complexity of software has dramatically increased during the last decades. Various software modeling techniques were developed in order to understand previously developed software as well as to develop complex software. These techniques include, for example, structural partitioning, regular model search and a crosscutting code based technique known as aspects.

There is a growing need to provide efficient methods and computer program products that will assist in understanding software, especially software that is modeled by a high complexity model.

SUMMARY OF THE PRESENT INVENTION

A method for providing a representation of software, the method includes: receiving semantic concern defining information; populating at least one semantic concern, in response to the received semantic concern defining information; and associating between multiple elements in response to semantic relation information, if the semantic relation defining information was previously received.

Conveniently, the method includes generating a graphical representation of at least one semantic concern.

Conveniently, the method includes generating a model entity graphical indication that comprises at least one associated semantic concern graphical indication.

Conveniently, the semantic concern graphical indication is a cue.

Conveniently, the populating includes applying a semantic query.

Conveniently, the populating is followed by detecting a re-evaluating event and applying the semantic query.

Conveniently, the detecting a re-evaluation event comprises detecting a model update.

Conveniently, the method includes allowing a user to access a semantic query library.

Conveniently, the method includes allowing a user to utilize a semantic query or a semantic query pattern from the semantic query library to provide a selected semantic query.

Conveniently, method includes analyzing the model and providing at least one potential semantic concern.

Conveniently, the analyzing comprises analyzing the model in response to at least one predefined analysis rule and in response to information provided by the user.

Conveniently, the receiving comprises receiving semantic concern graphical representation information.

Conveniently, the populating includes populating a semantic concern by at least one model entity and by at least one other semantic concern.

Conveniently, the method includes defining at least one semantic concern that indicates when a validation rule is violated.

Conveniently, the method includes saving at least one semantic concern in a persistent manner.

Conveniently, the method includes displaying at least one semantic element that belongs to a semantic concern or that is associated to another semantic element by a semantic relation.

Conveniently, the method includes re-evaluating a semantic relation in response to an alteration of a semantic entity associated with the semantic relation or model element.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Methods and computer program products for providing a representation of software. The software is initially modeled by multiple model entities that form a model.

Conveniently, the methods and computer program products allow users to arrange their representation of software in an intuitive manner that fits their semantic perception.

The methods and computer program products utilize semantic concerns and semantic relationships. A semantic concern can include zero or more semantic elements that are characterized by a one or more certain semantic characteristics. A semantic relation is an (n-ary) relation that represents the semantics of a relation between at least one group of semantic elements. A semantic element can be a model element or a semantic concern.

It is noted that different users can define different semantic concerns and semantic relations of different levels of abstraction and that these different definitions can independently co-exist.

The various illustrated methods can be used to validate a software. The validation can start by defining semantic concerns and/or semantic relations that may indicate when one or more validation rules are violated.

Figure 1:
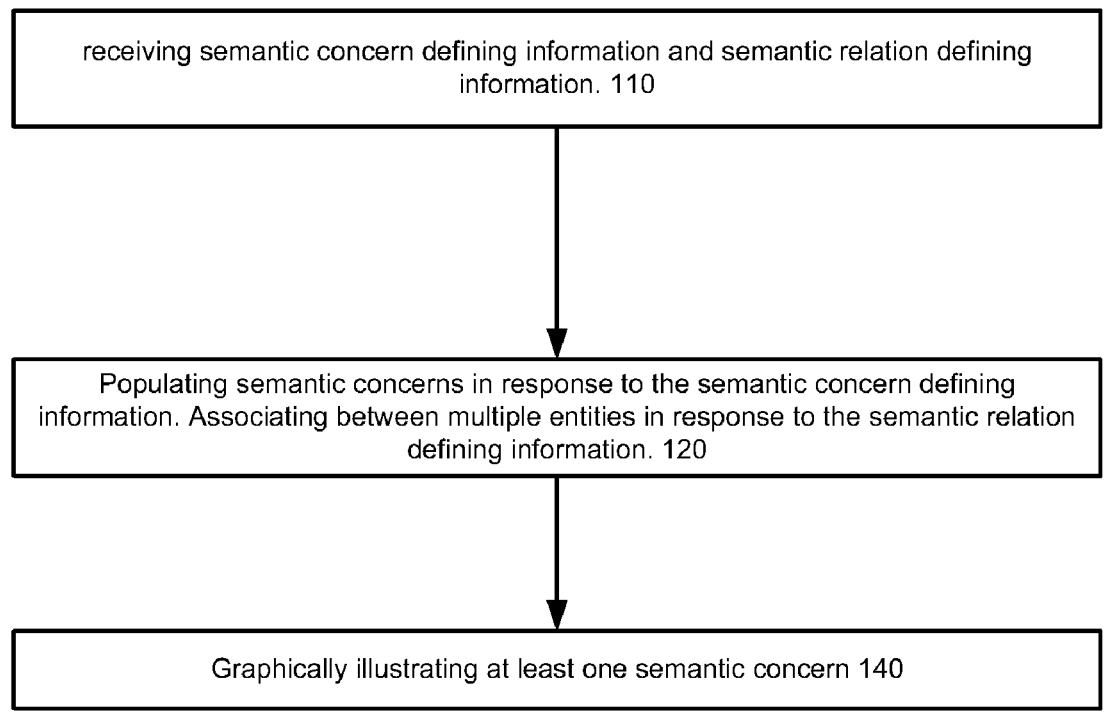
FIG. 1 is a flow chart of a method for providing a graphical representation of software modeled by a model, according to an embodiment of the invention.

FIG. 1 is a flow chart of method 100 for providing a representation of software modeled by a model, according to an embodiment of the invention.

Method 100 starts by stage 110 of receiving concern defining information and, alternatively or additionally, receiving semantic relation defining information 110.

A semantic concern as well as a semantic relation can be defined in various manners. Semantic concern defining information is information that assists in defining a semantic concern. The semantic concern defining information can include, for example a semantic query, semantic elements that should form a semantic concern and the like.

It is noted that semantic concerns can be populates and then displayed to a User. The display can be defined by the user. Accordingly, the manner in which one or more semantic concerns are displayed can be defined by semantic concern graphical representation information. The semantic concern graphical display information can be a part of the semantic concern defining information.

Semantic relation defining information is information that assists in defining a semantic relation.

A semantic concern can be used for various purposes, such for but not limited to learning existing software, defining characteristics of software application in advance, enforce an architectural structure on a model, detect violations, and the like.

Stage 110 is followed by stage 120 of populating semantic concerns in response to the received semantic concern information. Conveniently, stage 120 also includes associating (grouping) between multiple entities in response to received semantic relation information. A semantic concern should be populated by one or more semantic entities that are characterized by one or more certain semantic characteristics. If stage 120 did not find any semantic elements that are characterized by the one or more certain characteristic then the outcome of stage 120 can be a semantic concern with no members.

It is noted that the populated semantic concerns can be stored in various manners for future use. It is noted that semantic concerns and semantic relations are conveniently stored in a persistent manner.

Stage 120 is followed by stage 140 of graphically illustrating at least one semantic concern. It is noted that stage 140 can include displaying one or more semantic concern that was populated during stage 120. Stage 140 can include displaying semantic concerns as well as one or more entity models, and the like.

It is noted that a semantic element can belong to multiple semantic concerns. Semantic concerns that share a semantic element are referred to as partially overlapping semantic concerns.

Conveniently, the semantic concerns and semantic relations facilitate a definition of multiple abstraction levels. It is noted that the definition of semantic relations and the definition of semantic concerns can remain unchanged during a development process of the software.

Conveniently, the definition of semantic concerns and semantic relations as well as the semantic concern population process does not alter the model data. Thus, changes in the software model can be represented by changes in low abstraction level semantic relations as well as in higher abstraction level semantic concerns.

Semantic entities can be represented in various manners. Conveniently a graphical representation of a semantic entity includes (or is otherwise graphically linked to) a graphical representation of the semantic concern to which it belongs. According to an embodiment of the invention the graphical representation may include generating a model entity graphical indication that includes at least one associated semantic concern graphical indication. Thus, the relationship between a semantic element and the related semantic concern (or concerns) can be easily determined by looking at the visual representation displayed to the user. Conveniently, the semantic concern graphical indication is a cue, a color, an image and the like.

It is noted that the semantic concern can be defined as well as populated in various manners, as further illustrated by FIGS. 2-5.

A user can explicitly indicate which model members (or semantic concerns) should belong to a certain semantic concern. These model entities are referred to as static semantic concern members. The user can also request to remove one or more static semantic concern member from the semantic concern.

It is noted that if a certain semantic concern member is defined both statically and dynamically than it can be removed from the semantic concern if it is both statically and dynamically removes from the static concern.

Conveniently, method 100 includes defining at least one semantic concern that indicates when a validation rule is violated.

Conveniently, method 100 includes saving at least one semantic concern in a persistent manner. Semantic relations can also be stored in a persistent manner.

Conveniently, stage 140 includes displaying at least one semantic element that belongs to a semantic concern or that is associated to another semantic element by a semantic relation. It is noted that the semantic elements that form a semantic concern (if such semantic elements exists—as a semantic concern can be empty) can be exposed. The exposure may start by selecting the semantic concern.

Semantic relations can be created and deleted on the fly, in response to changes in one or more semantic entities linked by the semantic relations or in the target models. Conveniently, method 100 includes re-evaluating a semantic relation in response to an alteration of a semantic entity associated with the semantic relation. For example, if a semantic relation associated between two semantic entities and one semantic entity is empty (does not include any semantic concern member) then the semantic relation can be removed. It is further noted that the re-evaluation can include checking all semantic relations, as new semantic relation can be generated (or populated) in response to model updates.

Figure 2:
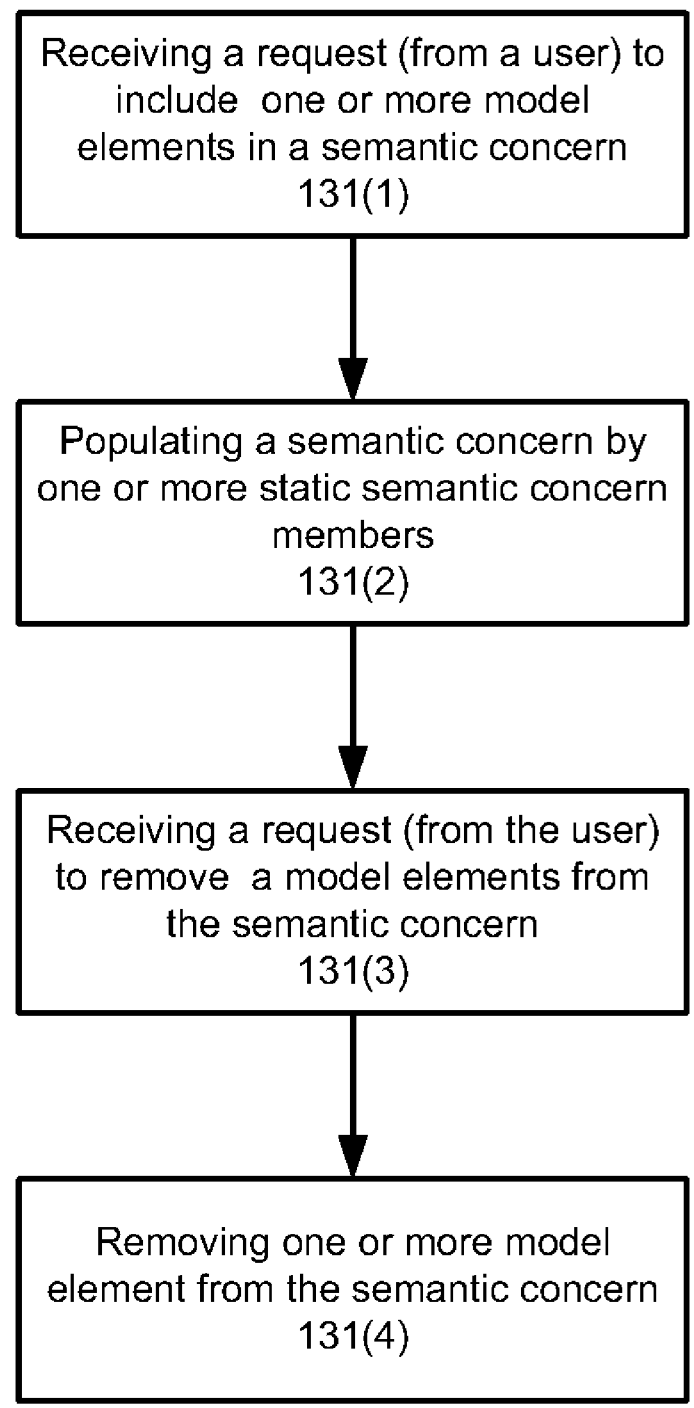
FIG. 2 illustrates a flow chart of a semantic concern static population process, according to an embodiment of the invention.

FIG. 2 is a flow chart of a semantic concern static population process 131, according to an embodiment of the invention.

Semantic concern static population process 131 starts by stage 131(1) of receiving (from a user) a request to include one or more model elements in a semantic concern. Stage 131(1) is followed by stage 131(2) of populating the semantic concern by one or model elements (referred to as static semantic concern members) indicated by the user.

Stage 131(2) is followed by stage 131(3) of receiving (from a user) a request to remove one or more model elements from a semantic concern.

Stage 131(3) is followed by stage 131(4) of removing the requested one or more model elements (referred to as static semantic concern members) from a semantic concern. It is noted that stages 131(1) and 131(3) can occur concurrently and that many iteration of various stages of process 121 can occur, not necessarily in the order indicated by FIG. 2.

A semantic concern can be populated by defining a semantic query and applying the semantic query on the software model or on the defined semantic concerns. The model entities (or semantic concerns) that comply with the semantic query are referred to as dynamic semantic concern members.

Conveniently, dynamic semantic concern members can be removed from a semantic concern if they no longer satisfy a semantic query. A semantic queries may be applied many times, thus the group of dynamic semantic concern members can change over time. Static semantic concern members can be explicitly removed from the semantic concern by the user.

It is further noted that semantic relations can also be defined in a static manner, in a dynamic manner or by a combination of both. A semantic relation that associates between groups of semantic elements is conveniently dynamically re-evaluated. A semantic relation can be re-evaluated in response to changes in the model.

Figure 3:
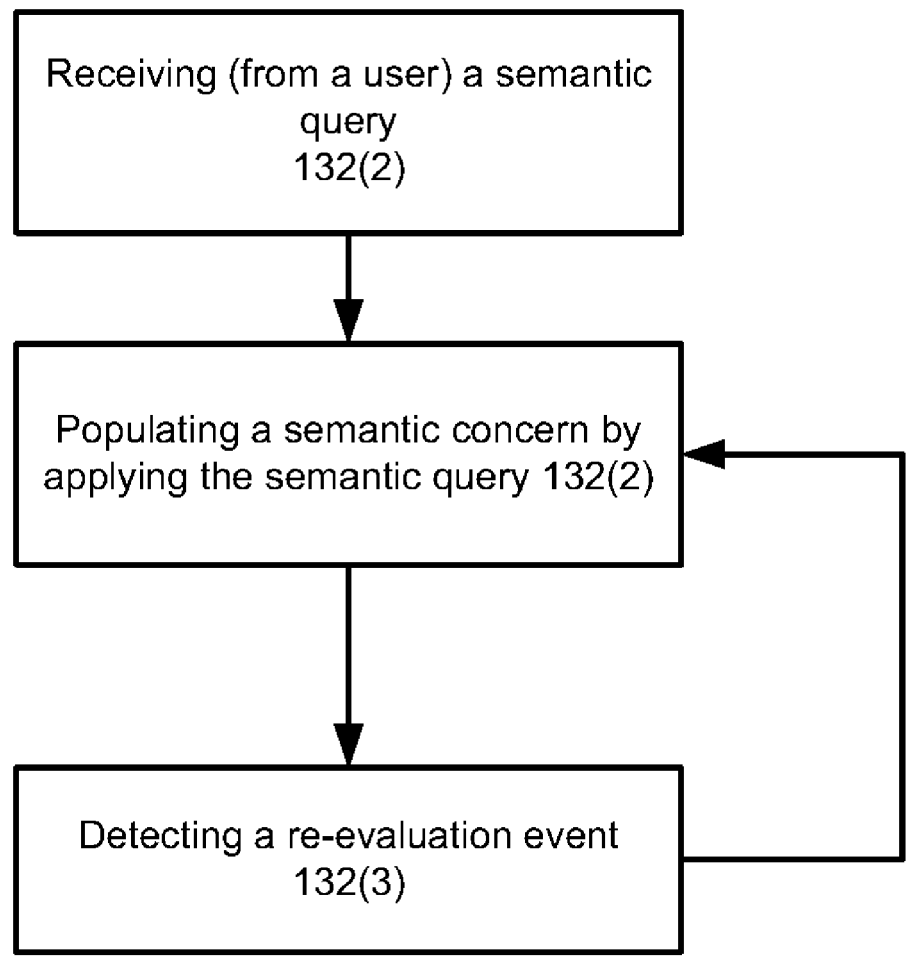
FIG. 3 illustrates a flow chart of a semantic concern static population process, according to an embodiment of the invention.

FIG. 3 illustrates a flow chart of a semantic concern dynamic population process 132, according to an embodiment of the invention.

The semantic concern dynamic population process 132 facilitates re-evaluation of the population of the semantic concern from time to time. The re-evaluation includes detecting that a re-evaluation is required (for example by detecting that a re-evaluation event occurred) and then populating the semantic concern by re-applying the semantic query.

The re-evaluation can be triggered by a request to perform one or more re-evaluation sessions. The triggering can be initiated by the user, by a predefined process and the like.

The re-evaluation can occur according to a predefined re-evaluation scheme.

The re-evaluation can occur in response to an occurrence of a certain event, for example if the software model was updated. It is noted that not each software model update triggers the re-evaluation. The user can request that only certain updates (for example of certain complexity) can trigger the re-evaluation.

Semantic concern dynamic population process 132 starts by stage 132(1) of receiving (from a user, conveniently at any time) a semantic query. Stage 132(1) is followed by stage 132(2) of populating the semantic concern by one or model elements (referred to as dynamic semantic concern members) by applying the semantic query on model entities and/or other semantic concerns. It is noted that once a semantic query is applied it can provide, as a result, zero or more semantic elements. There zero or more semantic elements are defined as semantic concern members.

Various exemplary semantic queries include: (i) a semantic query that defines a semantic concern as including all the model elements which represent persistent information, (ii) a semantic query that defines a semantic concern as including all model elements that were modified in order to solve a problem, (iii) a semantic query that defines a semantic concern as including all model elements associated with a certain operation of a user, (iv) a semantic query that defines a semantic concern as including all graphical interface related model elements, (v) a semantic query that defines a semantic concern as including all model elements associated in a certain manner with a certain model element/s, (vi) a semantic query that defines all model elements fixed to repair a defect; (v) a semantic query that indicates when a fault occurs, and the like.

It is noted that Stage 131(2) is followed by stage 131(3) of detecting a re-evaluation event and jumping to stage 132(2) of populating the semantic concern by applying (re-applying) the semantic query.

It is noted that a semantic concern can include both static and dynamic semantic concern members. Accordingly, a semantic concern can be populated by applying various stages of processes 131, 132 and the like.

A semantic query can be selected from a group (such as a library of) semantic queries. The selection can involve allowing a user to access a semantic query library and then allowing him to utilize (for example—select, modify, customize, convert) one or more semantic query.

The semantic query library can be defined in response to previous software model abstractions and the like. The library can include semantic queries, semantic query patterns as well as tools that enable to define or update semantic query patterns.

The semantic query library can be an extensible library to which domain experts and modelers can contribute semantic query patterns to be used when defining semantic concerns. This allows experts to capture domain semantics and thus help raise the level of abstraction in models of related domains. The use of the semantic query library also eases the definition of commonly used semantic queries since it frees modelers from defining all semantic queries from scratch or reinventing them.

Figure 4:
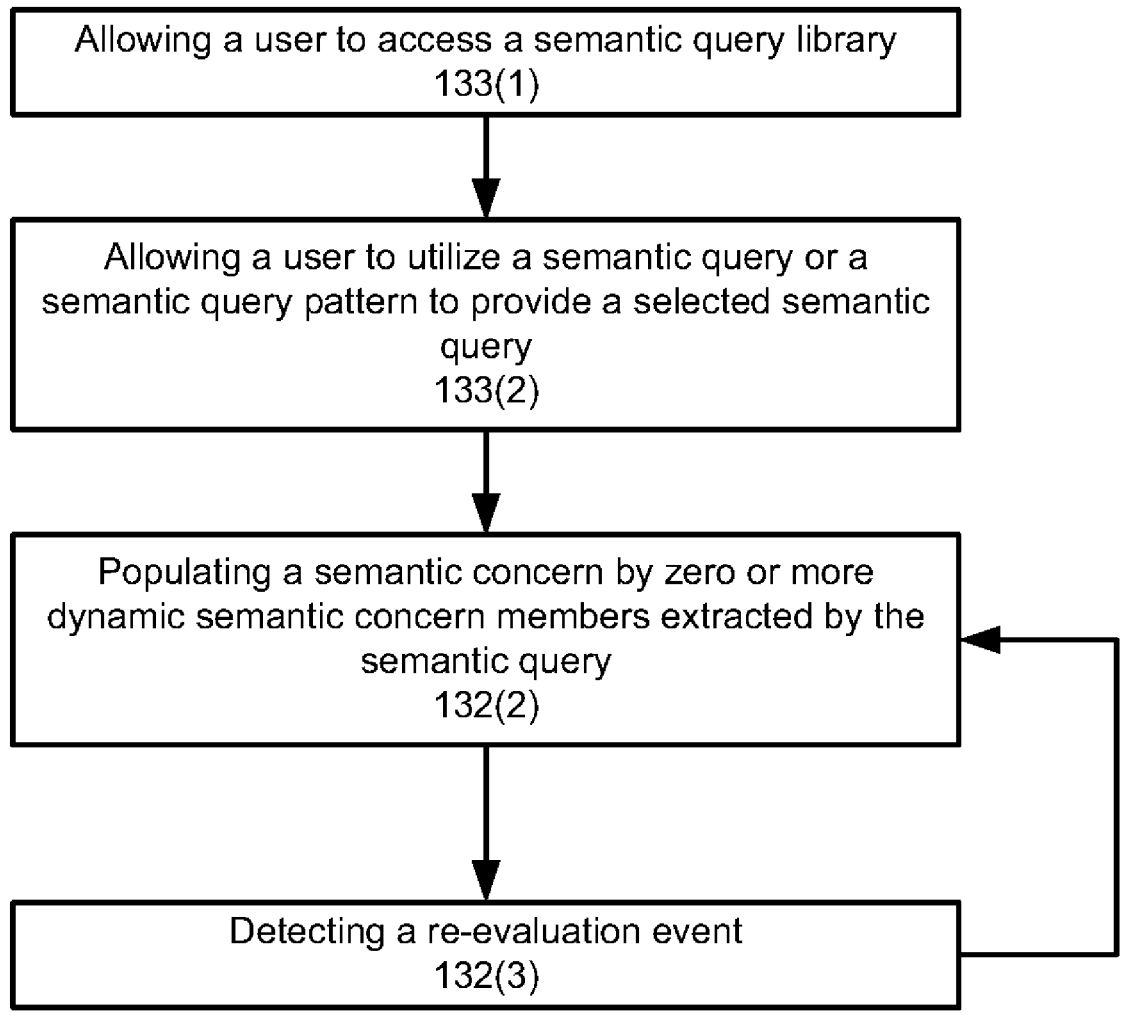
FIG. 4 illustrates a flow chart of another semantic concern dynamic population process, according to an embodiment of the invention.
Figure 5:
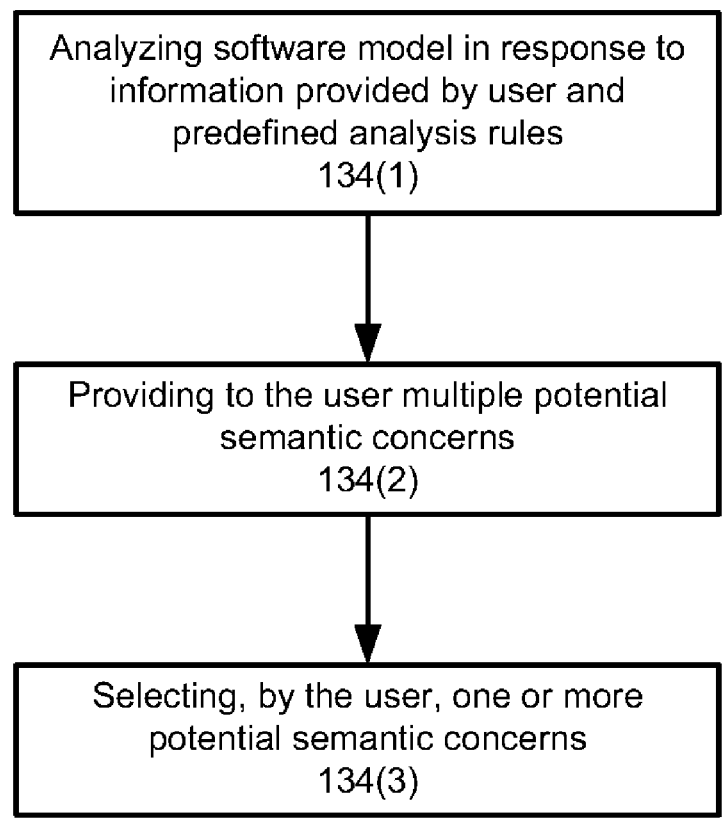
FIG. 5 illustrates a flow chart of an iterative semantic concern population process, according to an embodiment of the invention.

FIG. 4 illustrates a flow chart of another semantic concern dynamic population process 133, according to an embodiment of the invention.

Process 133 starts by stage 133(1) of allowing a user to access a semantic library. This can involve allowing user to access a storage unit, displaying information representative of the library and the like.

Stage 133(1) is followed by stage 133(2) of allowing a user to utilize a semantic query or a semantic query pattern to provide a selected semantic query. The user can, for example, perform one of the following: (i) select a semantic query or a semantic query pattern; (ii) modify a semantic query or modify a semantic query pattern to provide the selected semantic query, and the like. A user can instantiate a semantic query from the semantic query pattern following a configuration process. Semantic queries might be modified or extracted as is.

Stage 132(2) is followed by stage 132(3) of populating the semantic concern by one or more semantic elements by applying the semantic query on model entities and/or other semantic concerns. Stage 132(3) can be followed by stage 132(2).

According to an embodiment of the invention a semantic concern can also be defined in an automatic or semi-automatic (iterative) manner. The automatic analysis involves analyzing the software model by applying one or more predefined analysis rules. The rules can belong to an extendible set of registers analysis strategies.

The semi-automatic process can also include requesting information from the user, receiving information from the user and analyzing the software model according to the received information and the one or more predefined analysis rules.

Process 14 starts by stage 134(1) of analyzing the software model in response to information provided by the user and in response to predefined analysis rules (such as a predefined analysis strategy). The result of the analysis is multiple potential semantic concerns.

Stage 134(1) is followed by stage 134(2) of providing to the user the multiple potential semantic concerns.

Stage 134(2) is followed by stage 134(3) selecting, by the user, one or more potential semantic concerns. These selected semantic concerns are added to the representation of the software.

Figure 6:
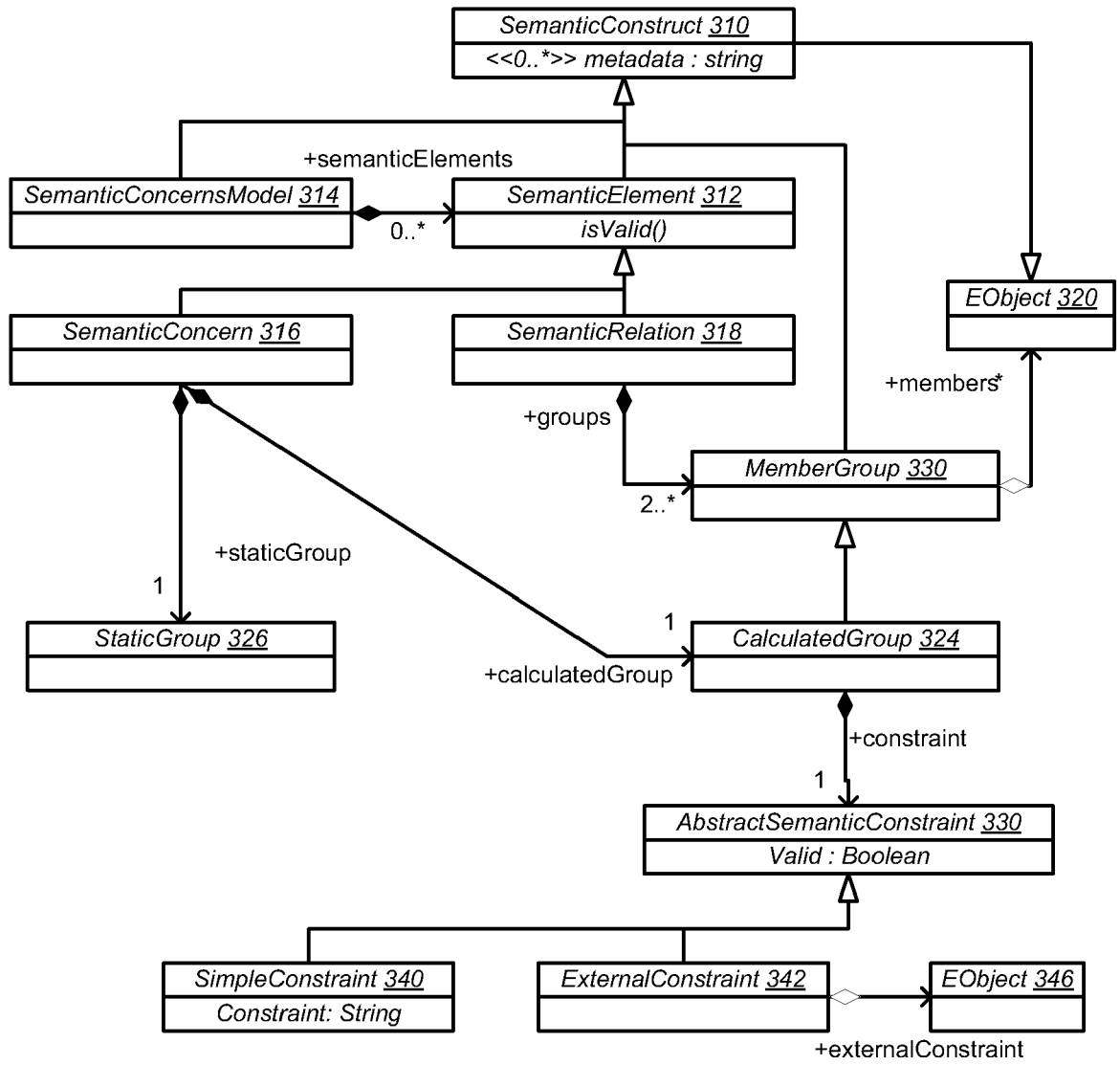
FIG. 6 illustrates a semantic concerns meta-model, according to an embodiment of the invention.

FIG. 6 illustrates a semantic concern meta-model 300, according to an embodiment of the invention.

FIG. 6 illustrates a semantic concern meta-model, according to an embodiment of the invention. FIG. 6 illustrates an Ecplise Modeling framework (EMF) meta-model.

It is noted that the meta-model 300 can be defined or illustrated in other formats. Meta-model 300 illustrates the relationships between different semantic entities that define semantic concerns and semantic relations.

All model entities inherit from the abstract class SemanticConstruct (box 310), marking them as Semantic Concern Model entities. It includes a "metadata" attribute which is a list of strings that enables extending tools to add information to the elements.

The top-level entity, SemanticConcernsModel (box 314), stores the semantic information of the target model. A single SemanticConcernsModel entity is created per target model. Among its properties is "domainID" which captures the unique name of the target model domain. This property can be used by tools to supply a domain specific environment for inspecting the target domain model.

A SemanticElement (box 312) is an abstract class that represents a construct that groups semantic information. Each SemanticConcernsModel contains a set of concrete descendants of SemanticElement. Among its properties are: name, description, and visual cue (holding a visual identifier e.g., color). The meta-model defines two concrete SemanticElement descendants: SemanticConcern (box 316) and SemanticRelation (box 318) that model the semantic concern and semantic relation respectively. Note that using this structure, one can simply extend this meta-model to introduce new types of semantic entities by defining new concrete descendants of SemanticElement.

Each semantic concern member can be classified as either static or dynamic. To model this in a flexible manner an abstract MemberGroup (box 330) class is introduced which can point by reference to a set of EObjects (box 346) which represent any EMF model entity instance. MemberGroup has two concrete decendents: StaticGroup (box 326) and CalculatedGroup (box 324). The StaticGroup represents a set of static semantic concern members. The CalculatedGroup represents a set of dynamic semantic concern members.

A SemanticConcern identifies its members through the two concrete MemberGroup entities it contains by value: a StaticGroup entity and a CalculatedGroup entity.

A SemanticRelation (box 318) represents an n-ary relation between entities, thus it contains by value a set of MemberGroup descendant entities that capture the members of each end. This structure allows flexibility in the type of elements comprising a relation (e.g. a SemanticConcern or a set of target model elements) and in the way that they are evaluated (i.e. static or dynamic).

The semantic query itself is represented in this model by the abstract AbstractSemanticConstraint entity (box 330). AbstractSemanticConstraint has two concrete descendants: SimpleConstraint (box 340) representing a string based constraint (e.g. OCL2 text) and ExternalConstraint (box 342) representing an external query structure. The AbstractSemanticConstraint entity has a Boolean property, valid. This property is used to indicate if the query is synchronized with the model. For example when the evaluation criteria of a query is based on a model element that has been deleted; in this case, instead of deleting the semantic entity that captures some semantics for the user, the tool can notify the user that the query is no longer valid and that it should be updated. This design allows more flexibility regarding query structures and types. For example, a user defines a semantic concern whose semantic query returns all descendants of class "File". As the model evolves, the user replaces class "File" with class "Resource" that has a wider scope. When class "File" is replaced, the semantic query becomes out of date. The tool indicated this to the user. Since the concern is still relevant to him, instead of deleting the semantic concern, he replaced its top-level entity to "Resource" in order to modify its content and maintain its semantics.

Figure 7:
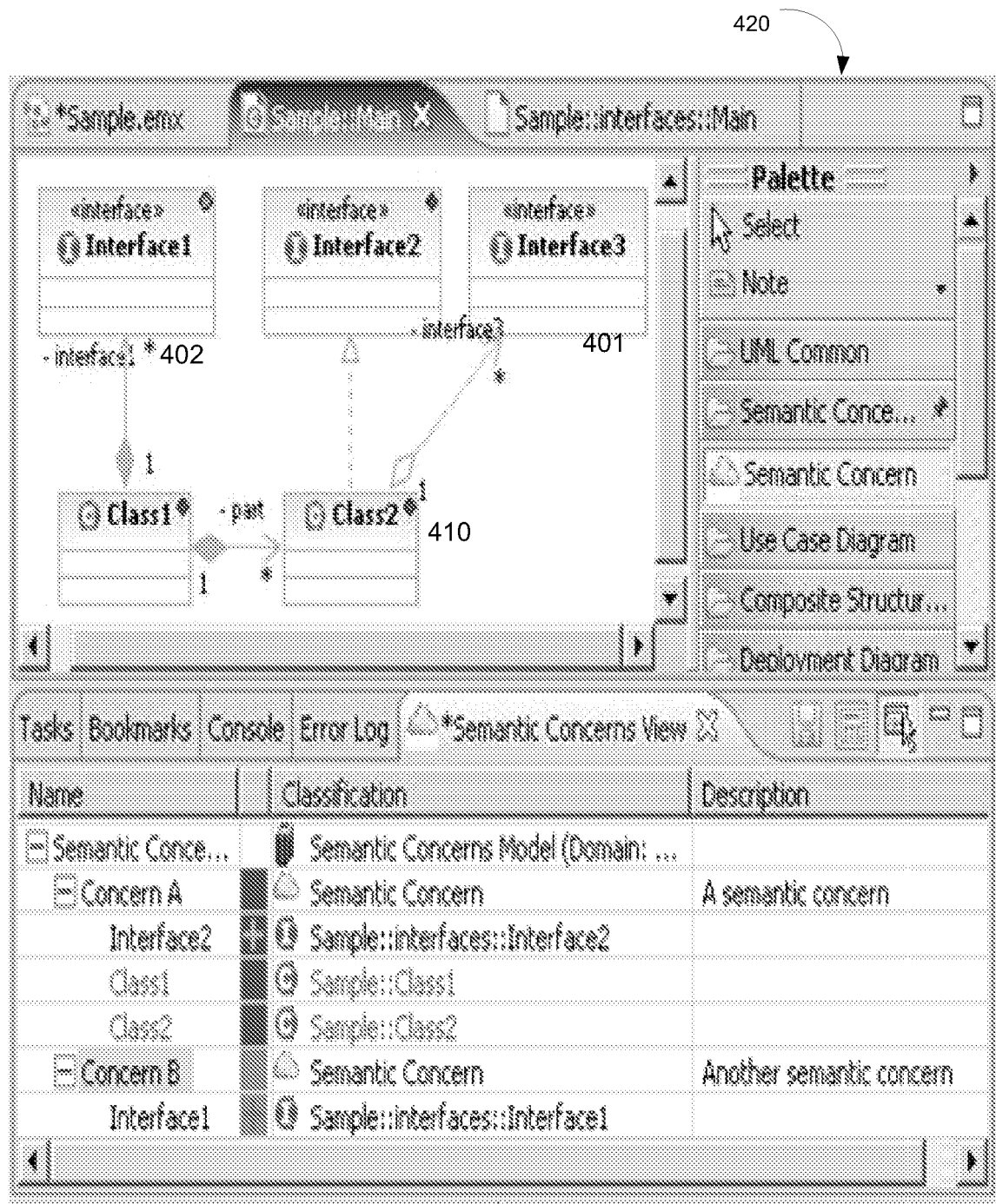
FIG. 7 illustrates a semantic concern display, according to an embodiment of the invention.

FIG. 7 illustrates an exemplary semantic concern display 400, according to an embodiment of the invention.

The semantic concern display 400 displays a visual representation of software or a portion of said visual representation, as illustrated by boxes 401-410. This visual representation includes multiple model entity graphical indications, some include at least one associated semantic concern graphical indication. The model entity graphical indicator is a circle whose color is the related SC visual cue.

Display 400 also includes various toolbars or hot keys, such as "semantic concern", "use case diagram", "composite semantic concern", "select", and the like that enable to edit or define semantic concerns and semantic relations, as illustrated by the upper right side of the display (box 420) and it also illustrates the relationships between various model members and semantic concerns (box 430). A semantic concern can be illustrated by its name, its visual cue (e.g. color code), and can be also accompanied by a textual description, and a list of schematic concern members.

Figure 9:
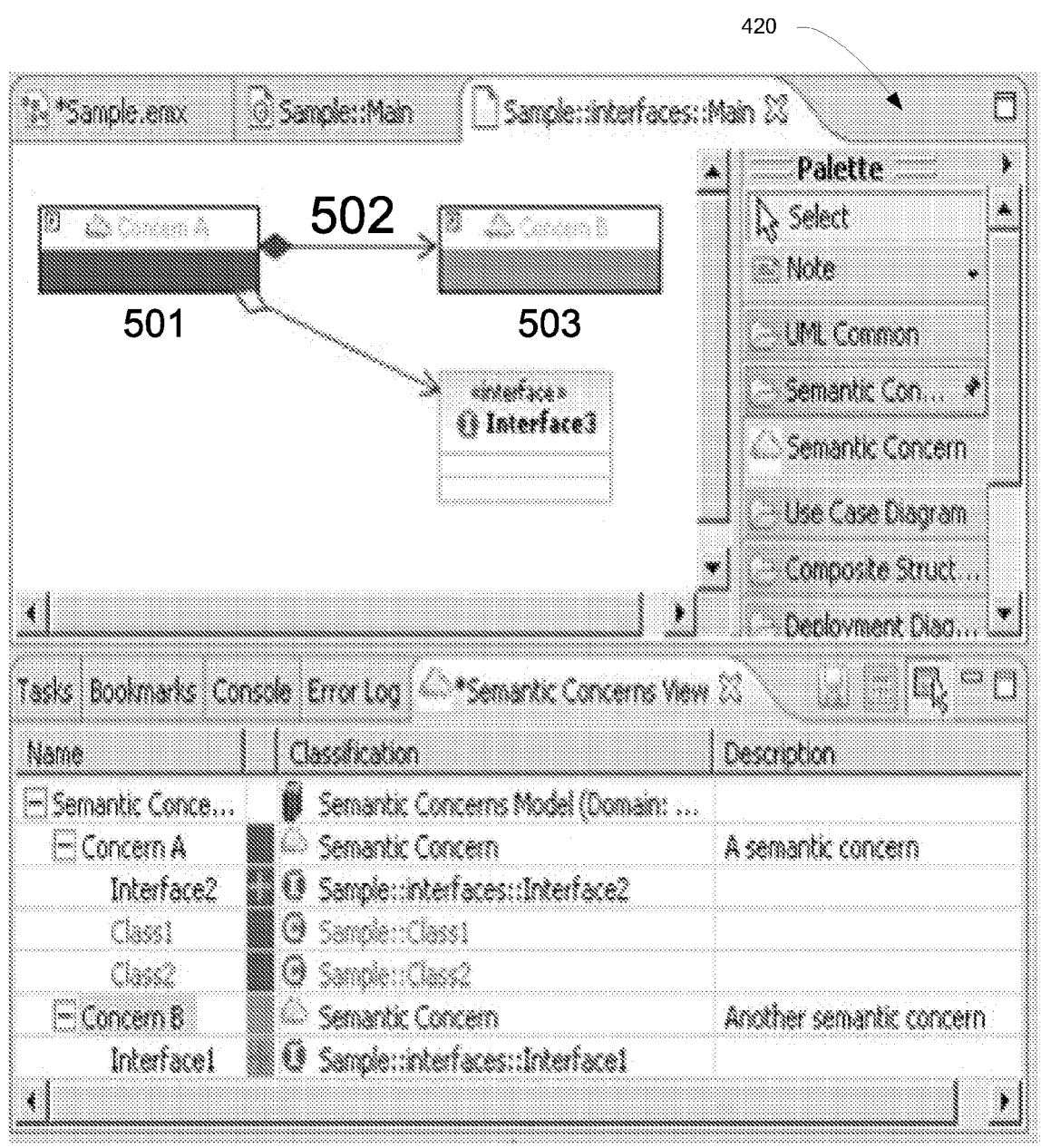
FIG. 9 illustrates a semantic relation and two semantic concerns, according to an embodiment of the invention.

The semantic concern members are displayed in a list. Each member is described in a row that includes its name, type (static or dynamic), visual identification within the model, and a textual description (if applicable). FIG. 9 illustrates an exemplary display 500 that shows two semantic concerns "Concern A" 510 and "Concern B" 520 that are related to each other by semantic relation 502.

It is noted that the relations can be graphically represented by arrows that link between multiple semantic entities, but other graphical representations can be used. The user can define the graphical representation. He can receive a default graphical representation and alter it.

Figure 8:
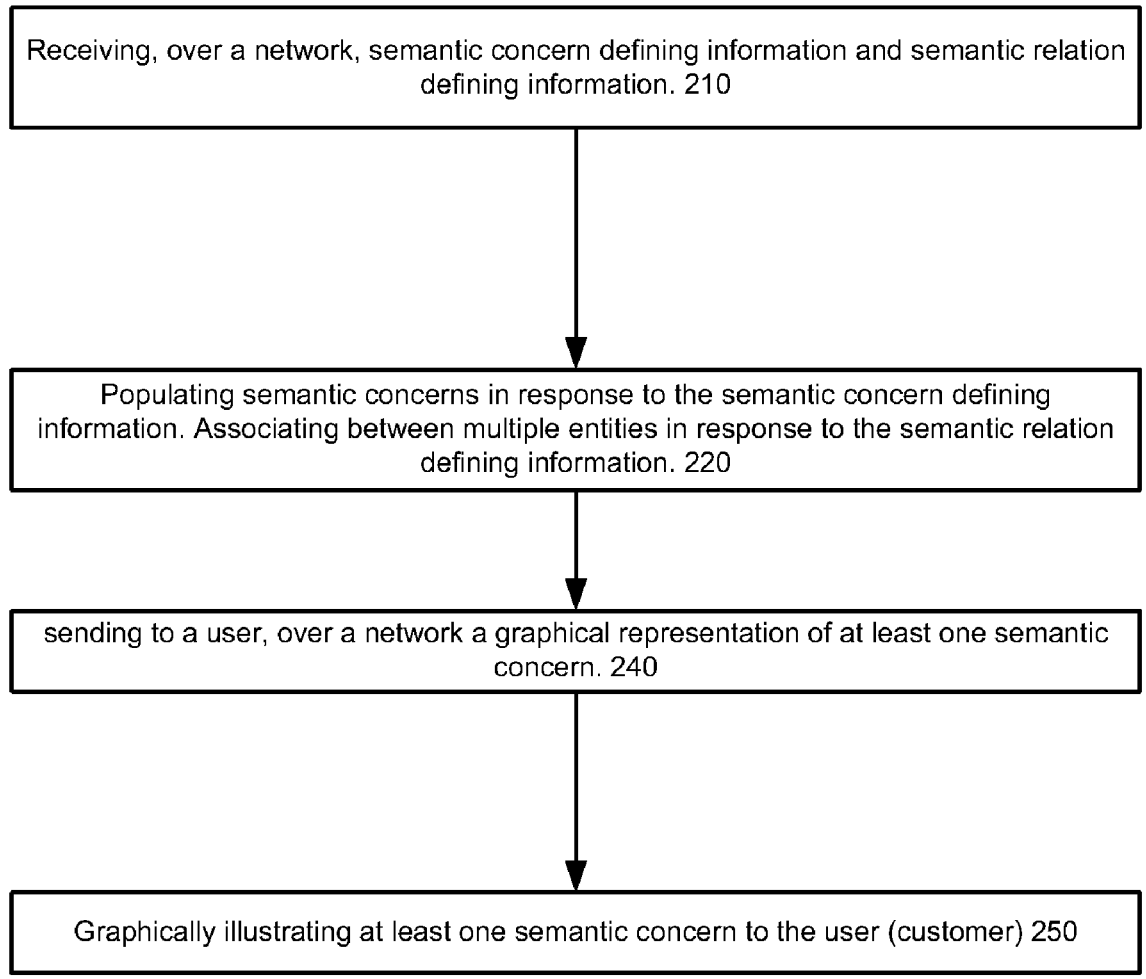
FIG. 8 is a flow chart of a method for providing a service, according to an embodiment of the invention.

FIG. 8 illustrates method 200 providing a service, according to an embodiment of the invention.

Method 200 starts by stage 210 of receiving concern defining information and alternatively or additionally receiving semantic relation defining information over a network.

Stage 120 is followed by stage 220 of populating semantic concerns in response to the received semantic concern information. Conveniently, stage 220 includes associating between multiple entities in response to the received semantic relation information.

It is noted that the populated semantic concerns can be stored in various manners for future use. For example, and as illustrated by stage 250, one or more semantic concerns can be displayed to a user.

Stage 220 is followed by stage 240 of sending to a user, over a network a graphical representation of at least one semantic concern.

Stage 240 is followed by stage 250 of graphically illustrating at least one semantic concern to a user. It is noted that stage 250 can include displaying one or more semantic concern that was populated during stage 220. Stage 250 can include displaying semantic concerns as well as one or more entity models, and the like.

According to another embodiment of the invention a service provided to a user can include sending, over a network, a model to a validation service that validates the model by applying a set of semantic concerns and semantic relations that enable a validation of the model. The validation service returns, over the network, a report (including graphical visualization) of the violations.

Yet according to another embodiment of the invention a distributed environment is provided. This environment includes one or networks connected to multiple devices. In this distributed environment multiple users can exchange over the network semantic concerns, semantic relations, semantic concern libraries and the like. This exchange can take place is different users share the same model or not.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for providing a representation of a software, the method comprising: receiving semantic concern defining information; populating at least one semantic concern, in response to the received semantic concern defining information; and associating between multiple semantic elements in response to semantic relation information, if semantic relation information was previously received, wherein associating is performed by
   constructing a plurality of models having model elements;
   executing a graphic interface on a computing device to display a graphic representation of the models;
   constructing semantic queries to validate the models;
   detecting a re-evaluation event;
   responsively to the re-evaluation event making a revision of the graphic representation to conform the at least one semantic concern to the re-evaluation event;
   automatically or semi-automatically, using the computing device, conforming the models with the revision of the graphic representation, updating the semantic queries in compliance with the conformed models; and
   executing the updated semantic queries to determine whether the software violates a predetermined validation rule.

2. A method of representing software, comprising the steps of:
   defining a meta-model of software to be validated comprising abstract semantic concerns and abstract semantic inter-relationships among the abstract semantic concerns;
   automatically, using a computing device, defining actual semantic concerns relating to the software;
   constructing a plurality of models representing respective ones of the actual semantic concerns and actual semantic inter-relationships therebetween, wherein the models have model elements comprising semantic elements and conform to the meta-model, and wherein the actual semantic concerns comprise dynamic actual semantic concerns that are subject to updating, and an n-ary relationship exists between at least one group of the model elements that comprises a set of the actual semantic concerns;
   executing a graphic interface on the computing device to display a graphic representation of the models;
   constructing semantic queries to validate the models;
   detecting a re-evaluation event;
   responsively to the re-evaluation event making a revision of the graphic representation to conform the dynamic actual semantic concerns to the re-evaluation event;
   automatically or semi-automatically, using the computing device, conforming the models with the revision of the graphic representation, updating the semantic queries in compliance with the conformed models; and
   executing the updated semantic queries to determine whether the software violates a predetermined validation rule.

3. The method according to claim 2, wherein the re-evaluation event comprises an alteration in one of the models.

4. The method according to claim 2, wherein the re-evaluation event comprises an alteration in one of the actual semantic concerns.

5. The method according to claim 4, wherein the alteration comprises an addition of one of the actual semantic concerns.

6. The method according to claim 2, wherein the re-evaluation event comprises an alteration in one of the actual semantic inter-relationships.

7. The method according to claim 6, wherein the alteration comprises a deletion of one of the actual semantic inter-relationships.

8. The method according to claim 6, wherein the alteration comprises an addition of one of the actual semantic inter-relationships.

9. The method according to claim 2, wherein constructing semantic queries comprises accessing a semantic query library.

10. A computer software product for representing software, including a non-transitory computer-readable storage medium in which computer program instructions are stored, which instructions, when executed by a computer, cause the computer to perform the steps of:
    defining actual semantic concerns relating to the software;
    constructing a plurality of models representing respective ones of the actual semantic concerns and actual semantic inter-relationships therebetween, wherein the models have model elements comprising semantic elements and conform to a meta-model, and wherein the actual semantic concerns comprise dynamic actual semantic concerns that are subject to updating, and an n-ary relationship exists between at least one group of the model elements that comprises a set of the actual semantic concerns;

executing a graphic interface to display a graphic representation of the models;

constructing semantic queries to validate the models;

detecting a re-evaluation event;

responsively to the re-evaluation event making a revision of the graphic representation to conform the dynamic actual semantic concerns to the re-evaluation event;

conforming the models with the revision of the graphic representation, updating the semantic queries in compliance with the conformed models; and executing the updated semantic queries to determine whether the software violates a predetermined validation rule.

11. The computer software product according to claim 10, wherein the re-evaluation event comprises an alteration in one of the models.

12. The computer software product according to claim 10, wherein the re-evaluation event comprises an alteration in one of the actual semantic concerns.

13. The computer software product according to claim 12, wherein the alteration comprises an addition of one of the actual semantic concerns.

14. The computer software product according to claim 10, wherein the re-evaluation event comprises an alteration in one of the actual semantic inter-relationships.

15. The computer software product according to claim 14, wherein the alteration comprises a deletion of one of the actual semantic inter-relationships.

16. The computer software product according to claim 14, wherein the alteration comprises an addition of one of the actual semantic inter-relationships.

17. The computer software product according to claim 10, wherein constructing semantic queries comprises accessing a semantic query library.

\* \* \* \* \*